April 14, 1964

T. V. SELING 3,129,330

MICROWAVE RADIOMETER SYSTEM

Filed June 30, 1958

INVENTOR.
Theodore V. Seling
BY
E.W. Christen
ATTORNEY

April 14, 1964

T. V. SELING

3,129,330

MICROWAVE RADIOMETER SYSTEM

Filed June 30, 1958

INVENTOR.
Theodore V. Seling
BY
E. W. Christen
ATTORNEY

United States Patent Office 3,129,330
Patented Apr. 14, 1964

3,129,330
MICROWAVE RADIOMETER SYSTEM
Theodore V. Seling, Davison, Mich., assignor to General Motors Corporation, Detroit, Mich., a corporation of Delaware
Filed June 30, 1958, Ser. No. 745,760
14 Claims. (Cl. 250—83.3)

This invention relates to object detecting systems and more particularly to radiometer or passive detecting systems which are responsive to the radiant energy emanating from the objects.

Systems have been devised for detecting the presence of bodies by measuring the electromagnetic radiation from such bodies at microwave frequencies. It is known that the radiated energy from a body at a temperature above absolute zero extends throughout the frequency spectrum and the distribution of energy as a function of wave length and temperature of the radiating body is known. The majority of the energy is concentrated in the infrared portion of the spectrum while a much lower level of energy exists at the microwave frequencies. Although the radiated energy at the microwave frequencies, for example, above 600 megacycles, is of a low order of magnitude, it is highly advantageous to employ receiving systems operating in this portion of the spectrum.

The radiated energy at a given frequency for an ideal black body radiator is primarily a function of its absolute temperature but the radiated energy from a non-black body radiator depends also upon its radiation efficiency. Consequently, different bodies at the same temperature radiate different amounts of energy. It is, therefore, possible with a highly directive receiving system to scan a background area, such as the earth's surface, and by sensing the changes in radiated energy to detect the presence of objects having radiation efficiency different from that of the background area. By this technique, a signal voltage is developed corresponding to each object within the background area and the signal voltage may be utilized to construct a map of the objects within the entire area.

As a consequence of the low energy radiated at microwave frequencies, the received signal strength for a typical radiometer system is a low order of magnitude. For example, the power received from the earth's surface is in the order of one micro-wave watt. In order to realize good performance from such a radiometer system, the noise power developed in the receiver circuits must be reduced to an exceedingly low level so that the system will yield a high signal-to-noise ratio.

In accordance with this invention, a radiometer system is provided which is capable of producing a distinct map of objects within an area on the earth's surface. This is accomplished by developing a signal voltage corresponding to a particular object by subtracting from the total received power a reference quantity which corresponds to the radiated power from the background area. For this purpose, a modulator is employed to modulate the signal voltage with a reference voltage. By performing the modulation after detection of the signal voltage, an improved signal-to-noise ratio is realized. Additionally, in order to avoid deterioration of the signal-to-noise ratio by variations in the amplifier gain in the system, the reference voltage is derived from the signal voltage. Further improvement in the signal-to-noise ratio is realized by the use of a bandpass filter following the modulator and having a bandwidth related to the antenna beam width and the scan rate in such manner that the greatest signal-to-noise ratio is obtained without loss of information present in the signal.

A more complete understanding of this invention may be had from the detailed description which follows taken with the accompanying drawings in which.

Figure 1:
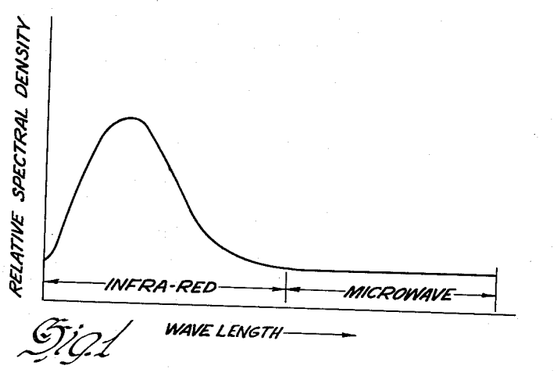
FIGURE 1 shows the distribution of thermal radiation as a function of frequency for a black body radiator at a given temperature.

The thermal radiation from a black body radiator is characterized by a very wide frequency spectrum and a random phase relation among the various frequency components with an energy distribution at a given temperature as shown in FIGURE 1. This distribution is defined by Plancks' Radiation Law which for relatively low frequencies, such as microwaves, and high temperatures, reduces to the following expression known as the Rayleigh-Jeans Law:

$$I = \frac{8\pi f^2 k T \Delta f}{c^3} \quad (1)$$

where $I$ = intensity of radiation.
$f$ = lower limit of frequency.
$f + \Delta f$ = upper limit of frequency.
$k$ = Boltzman constant.
$T$ = absolute temperature.
$c$ = velocity of light.

In a radiometer receiver, it is apparent that the received signal power will increase with the bandwidth of the receiver and if an antenna having a finite bandwidth is employed, the available thermal power is:

$$P = kTB \quad (2)$$

where $P$ = power received (watts).
$k$ = Boltzman's constant (watt-sec./°K.).
$T$ = absolute temperature of the object intercepted by the antenna beam pattern. (°K.)
$B$ = bandwidth of antenna system (c.p.s.).

It appears from this relation that the received power depends only on the temperature of the object intercepted by the antenna beam pattern and the bandwidth of the antenna system. Although the Rayleigh-Jeans Law states that the intensity of radiation at a particular frequency is proportional to the square of the frequency, the power received by an antenna is proportional to intensity of radiation and the area intercepted by the radiation pattern. A given antenna has a solid angular coverage inversely proportional to the square of the frequency of operation. Since the intensity of radiation increases as the square of the frequency and the area intercepted by the solid angle of the antenna pattern decreases as the square of the frequency, it is apparent that the received power is independent of frequency.

Figure 2:
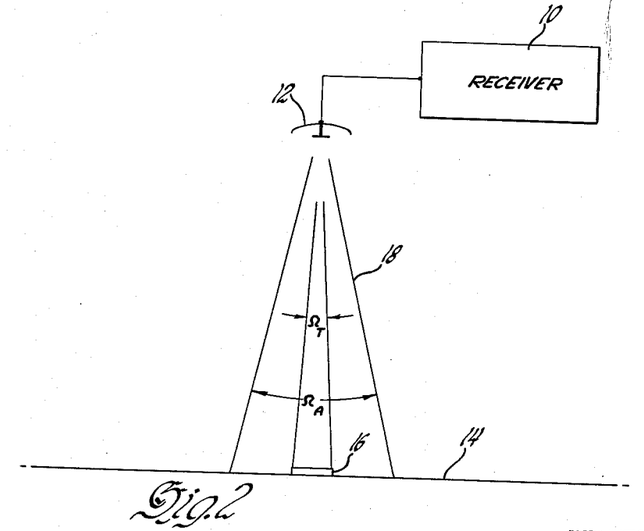
FIGURE 2 is a diagram of the radiometer relative to a background area containing a target.

Consider a receiving system which is disposed remotely from a background area within which it is desired to detect the presence of discrete bodies or targets. As shown in FIGURE 2 a receiver 10, suitably installed in an aircraft, includes an antenna 12 directed at the surface of the earth 14, including a target 16. For the present discussion, it will be assumed that both the earth and the target are ideal black body radiators, the earth having an absolute temperature $T_E$ and the target having an absolute temperature $T_T$. The radiation pattern 18 of the antenna intercepts the earth's surface to define a background area which subtends a solid angle $\Omega_A$ to the antenna. The solid angle $\Omega_T$ is subtended by the target. The total power radiated within the antenna pattern will be the power radiated from the earth for the entire intercepted area minus the power radiated from the earth covered by the target plus the power radiated by the target. This may be expressed as:

$$P = P_E - \frac{\Omega_T}{\Omega_A} P_E + \frac{\Omega_T}{\Omega_A} P_T \quad (3)$$

where $P$ = total received power.
$P_E$ = background power radiated within the entire intercepted area.
$P_T$ = power radiated by the target.

Referring to Equation 1, this relationship may be expressed in terms of temperatures as follows:

$$P = kT_E B_R + \frac{\Omega_T}{\Omega_A}(kT_T B_R - kT_E B_R) \quad (4)$$

where $B_R$ = bandwidth of the receiving system.

Expressing the difference between the target and earth temperatures as $\Delta T$, Equation 4 may be rewritten as:

$$P = kT_E B_R + \frac{\Omega_T}{\Omega_A} k B_R \Delta T \quad (5)$$

The first term of Equation 4 represents the power received from the earth in the absence of a target and the second term is the change in received power due to the presence of a target. This relationship may be expressed as:

$$P = P_E + \Delta P \quad (6)$$

and $\Delta P$ can be either positive or negative depending upon whether the target temperature is greater or less than the earth temperature. If the antenna scans across the earth, the received power will vary in accordance with the different targets which are intercepted by the radiation pattern of the antenna. This variation in power, denoted $\Delta P$, represents the presence of a target and by correlating this variation in power with the position of the antenna radiation pattern, a thermal map of the background area may be constructed to plot the position of the targets within the area.

In order to measure the change in thermal radiation which represents the presence of a target, a signal must be developed corresponding to the difference between the total received power and the background power. The receiving system, shown in FIGURE 3, develops such a signal voltage by subtracting the background power from the total received power in accordance with the expression $$\Delta P = P - P_E \quad (7)$$

Figure 3:
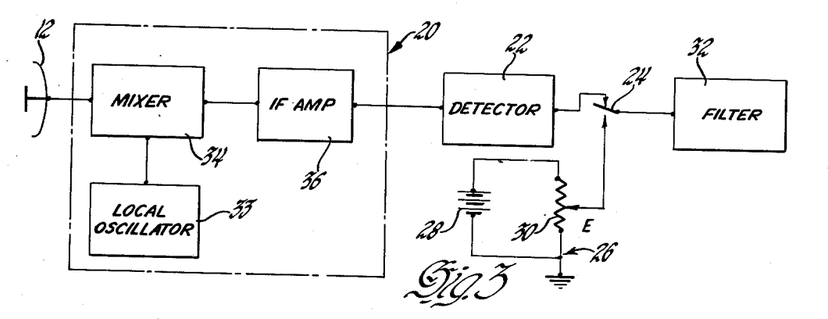
FIGURE 3 is a diagram of a radiometer.

The receiving system comprises an antenna 12 coupled with the amplifier 20 and the thermal power appearing at the input of the amplifier is due to the thermal radiation from the intercepted area of the antenna radiation pattern. However, in a practical amplifier, noise is generated in the amplifier and the output power from the amplifier is the sum of the received thermal power and the amplifier noise power. The power output is $$P_0 = (P_E + \Delta P + P_N) G \quad (8)$$

where $P_N$ = noise power generated in the amplifier referred to the input.
$G$ = power gain of the amplifier.

The output from the amplifier 20 is applied to the detector 22 which is suitably a square law detector. Since the output voltage from the amplifier is characterized by the superposition of a large number of alternating components, the output voltage from the detector will be a direct voltage component with superimposed alternating voltage components both of which are proportional to the input power. Accordingly, the direct component or average value of the output voltage from the detector is $$q = aG(P_E + \Delta P + P_N) \quad (9)$$

where $a$ = the constant of proportionality for the square law detector.

The actual output of the detector fluctuates about this value in accordance with the alternating component and the root mean square value of the alternating component is considered to be noise voltage.

In order to subtract the background or reference power from the total received power, a modulator, suitably in the form of a chopper 24, is employed. The detector output voltage $q$, representing the sum of the received power and amplifier noise power, is applied to one fixed contact of the chopper. A reference voltage E, representing the sum of the background power and amplifier noise power, is developed by the reference voltage generator 26 and applied to the other fixed contact of the chopper. The reference voltage generator 26 suitably comprises a voltage source 28 in series with a potentiometer 30 which develops the desired reference voltage E at its movable contact. The output voltage from the chopper 24, developed on its movable contact, is a square wave having an amplitude representing the difference of the two input voltages and hence corresponding to the change in power due to a target as shown by the following equation $$q - E = aG(P_E + \Delta P + P_N) - aG(P_E + P_N)$$
$$q - E = aG \Delta P \quad (10)$$

This expression for the change of received power is derived from the direct component only of the detector output and may be considered the signal voltage of the receiver system. The alternating component of the detector output is also proportional to the input power to the detector and is considered to be a noise voltage and in order to obtain a good signal-to-noise ratio, it must be suppressed. In order to reduce the alternating component at the output of the detector, the modulator is followed by a narrow bandpass filter 32 having its maximum response at the modulator frequency. Accordingly, the voltage output from the filter is a sine wave at the modulator frequency of less amplitude than that of the input square wave since the high frequency components are removed. This results in a small reduction in the signal but a large reduction in the noise.

Consider now the signal-to-noise ratio of the receiving system just described. For the present, assume that the amplifier 20 is a simple amplifier rather than a superheterodyne amplifier as depicted in FIGURE 3. The signal voltage at the filter output is a sine wave proportional to the change in received power since the modulator subtracts the background power and the noise power from the total received power. Since the modulator samples the change in power only one-half the time and the filter reduces the root means square value of the signal by a factor of $2/\pi$, the expression for the mean square signal voltage is.

$$s^2 = \frac{1}{2}\left(\frac{2}{\pi}\right)^2 a^2 G^2 \Delta P^2 \qquad (11)$$

Since the noise voltage is proportional to the input power to the detector which is sampled by the modulator only one-half the time and depends upon the bandpass of the filter, the mean square value of the noise component is $$N^2 = \frac{1}{2}(2a^2 G^2 P^2)\frac{B_F}{B_R} \qquad (12)$$

where $B_F$ = bandpass of the filter.
$B_R$ = bandpass of the receiver system ahead of the filter.

The signal-to-noise ratio is derived by dividing Equation 11 by Equation 12 which results in $$\frac{S^2}{N^2} = \frac{2}{\pi^2}\frac{B_R}{B_F}\frac{\Delta P^2}{P^2} \qquad (13)$$

This signal-to-noise ratio may be expressed in terms of temperatures by $$\frac{S^2}{N^2} = \frac{2}{\pi^2}\frac{B_R}{B_F}\frac{\left(\frac{\Omega_T}{\Omega_A}\Delta T\right)^2}{\left[T_E + T_P(F-1) + \frac{\Omega_T}{\Omega_A}\Delta T\right]^2} \qquad (14)$$

where $T_P$ = the reference temperature at which the noise figure of the amplifier is determined.
$F$ = the noise figure of the amplifier.

From Equation 14, it is apparent that the receiving system for high signal-to-noise ratio should have a wide bandwidth preceding the detector, a narrow bandwidth following the detector and an amplifier with a low noise figure.

The Equation 14 for signal-to-noise ratio is based upon a simple amplifier preceding the detector. Consider now a superheterodyne amplifier, as illustrated in FIGURE 3, having the same bandwidth and noise figure as that of the simple amplifier previously considered. This amplifier comprises a local oscillator 33, a mixer 34 and an intermediate frequency amplifier 36. The superheterodyne amplifier is capable of amplifying at two frequencies corresponding to the same and difference of the local oscillator frequency and the intermediate frequency. With a local oscillator frequency $f_0$ and an intermediate frequency $f_1$, the two amplified frequencies are $f_2 = f_0 - f_1$
$f_3 = f_0 + f_1$ In this system, with the antenna designed to respond equally well to both frequencies $f_2$ and $f_3$, the thermal power appearing at the input of the amplifier is the sum of the power received at the two frequencies. Since this thermal power is independent of frequency, the input power to the amplifier will be doubled but the noise generated in the amplifier will remain unchanged as determined by its noise figure. In effect, the power received by the superheterodyne amplifier at two frequencies is equivalent to the power received by the simple amplifier at a single frequency from a radiating body at twice the temperature. As a result, the signal-to-noise ratio expression for the simple amplifier of Equation 14 is modified for a superheterodyne amplifier by doubling the temperatures as follows $$\frac{S^2}{N^2} = \frac{2}{\pi^2}\frac{B_R}{B_F}\frac{\left(2\frac{\Omega_T}{\Omega_A}\Delta T\right)^2}{\left[2T_E + T_P(F-1) + 2\frac{\Omega_T}{\Omega_A}\Delta T\right]^2} \qquad (14')$$

This is equivalent to doubling the bandwidth without increasing the noise generated within the receiver. It is found that the superheterodyne system has a signal-to-noise ratio which is 2.5 to 4 times larger, depending upon the value of the amplifier noise figure, than a system using a simple amplifier.

Modulation of the signal voltage corresponding to received power after the detector results in a substantial improvement in signal-to-noise ratio because the noise voltage is proportional to the input power to the detector. In the case of modulation after the detector, this input power to the detector is $$P_d = \tfrac{1}{2} G(P_E + P_N + \Delta P) \qquad (15)$$

since the modulator samples the input power only one-half the time. However, in the case of modulation before the detector, the power applied to the detector is the average of the amplifier output power and the background power which is expressed as follows:

$$P_d' = G\left[\frac{(P_E + P_N + \Delta P + P_E + P_N)}{2}\right]$$

$$P_d' = G\left(P_E + P_N + \frac{\Delta P}{2}\right) \qquad (16)$$

Consequently, the root mean square value of the noise voltage for modulation before the detector is almost twice as great as for modulation after the detector. The mean square value of the signal voltage, however, is the same for both cases and as a result, the signal-to-noise ratio is improved by about three decibels when modulation is performed after detection. It is noted, however, that where the modulator follows the detector, the voltage corresponding to background power does not pass through the amplifier with the voltage corresponding to the received power and consequently, gain variation of the amplifier can result in the generation of false signals.

As mentioned previously, the signal-to-noise ratio for the receiving system is improved by the narrow bandpass filter 32 following the modulator and having its greatest response at the modulator frequency. The improvement to be realized by restricting the bandwidth of this filter is limited by the requirement of sufficient bandwidth to retain the information present in the signal. When the antenna scans the earth, the receiver power is a function of the antenna position and the change in power for a point target may be considered to be a rectangular pulse. The amplitude of this pulse is proportional to the difference in temperature between the target and the background. The time duration of this pulse is determined by the beam width $B_A$ of the antenna and the scan rate $W_s$ of the antenna as follows:

$$t = \frac{B_A}{W_s} \qquad (17)$$

The bandpass of the filter must be sufficient to allow this pulse to build up to a reasonable value, such as 90 percent of its full value. The minimum bandwidth of the filter can be expressed in terms of the build up time of a bandpass filter by the expression $$B_F = \frac{0.70}{t_B} \qquad (18)$$

where $B_F$ = the bandwith of the filter.
$t_B$ = the build up time of the bandpass filter. (See Vacuum Tube Amplifiers, Valley and Wallman, vol. 18, Radiation Laboratory Series, page 80.)

By substituting Equation 17 into Equation 18, the minimum bandwidth of the filter 32 is related to the antenna scan rate and the bandwidth as follows:

$$B_F = 0.70\frac{W_s}{B_A} \qquad (19)$$

Figure 4:
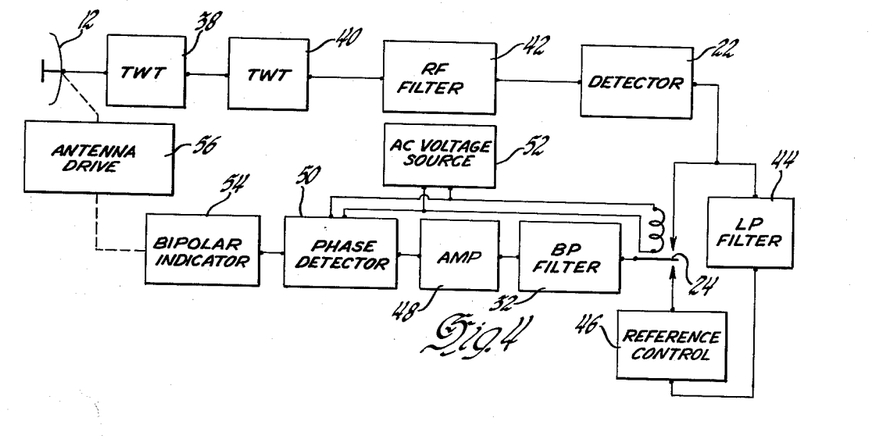
FIGURE 4 is a diagram of a radiometer and thermal mapping system.

In FIGURE 4 there is shown a radiometer receiving system adapted for producing a thermal map of selected areas and including means for compensating for amplifier gain variations. The adverse effect of such gain variations when the modulation follows detection, as mentioned previously, is the generation of false target signals. This system comprises an antenna 12 coupled with the amplifier comprising traveling wave tubes 38 and 40. The output of the traveling wave tube 40 is coupled through a radio frequency filter 42 having a bandpass corresponding to the bandwidth of the antenna to effectively restrict the bandpass of the amplifier and hence reduce the noise figure thereof. The detector 22 operates as a square law detector and the output of the detector is used to generate a reference voltage as well as a signal voltage. To develop the signal voltage, the output of the detector is applied to one fixed contact of the chopper 24. To develop the reference voltage which corresponds to the sum of the background power and the amplifier noise, the output of the detector is coupled through a low pass filter 44 and a reference voltage attenuator or control 46 to the other fixed contact of the chopper 24. As discussed previously, the direct component of the output voltage of the detector 22 corresponds to the sum of the background power, the amplifier noise power, and the change of background power $\Delta P$ corresponding to a target. In order to develop a reference voltage from this direct component, the time constant of the low pass filter 44 is made sufficiently large that the variations in the detector output due to target induced changes in the radiated power are removed. The reference control 46 permits adjustment of the filter output voltage so that the reference voltage is equal to the signal voltage in the absence of a target. The signal voltage output from the chopper 24 therefore corresponds to the change in radiated power due to target presence and is applied to the bandpass filter 32 which improves the signal-to-noise ratio in the manner previously described. Since the reference voltage and signal voltage are both derived from the output of the amplifier, gain variations are compensated.

Figures 5, 6:
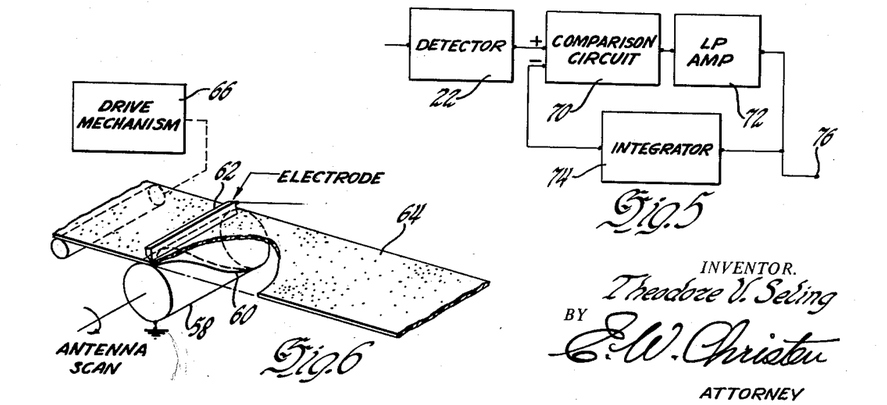
FIGURE 5 shows a circuit for developing a reference voltage.
FIGURE 6 shows a type of facsimile recorder which may be used in the system.

An alternative circuit arrangement wherein both the reference voltage and the signal voltage are derived from the output of the detector is shown in FIGURE 5. The output voltage of the detector 22 is applied as one input voltage to a direct current modulator or comparison circuit 70 and as previously mentioned, includes a direct component corresponding to the sum of the background power, amplifier noise power and the change of background power corresponding to a target. The detector output voltage also includes an alternating component which is considered to be a noise voltage and the output voltage of the comparison circuit 70 is applied to the input of a low pass amplifier 72 having a sufficiently long time constant to remove the alternating component. The output voltage from the low pass amplifier is fed back through an integrator circuit 74 to another input terminal of the comparison circuit 70. The integrator circuit 74 has a sufficiently long time constant so that the changes in the direct component of the detector voltage corresponding to the occurrence of a target are removed. Thus, the output voltage of the integrator circuit 74 corresponds to the time average value of the direct component of the detector voltage arising from the background power and the amplifier noise power. The output voltage of the integrator circuit 74 is equal in amplitude and opposite in polarity to the output voltage of the detector in the absence of a target. The integrator circuit is effective to remove any long time changes from the system such as produced by amplifier gain variations and background temperature variations. The signal voltage output derived from the terminal 76 therefore corresponds to changes in radiated power due to the presence of a target and is applied to a suitable indicating device.

For the purpose of constructing a thermal map of targets within a selected area, the signal voltage derived from the bandpass filter 32 is amplified to a usable power level by the amplifier 48. The amplified signal voltage is applied to the phase detector 50 which discriminates between hot and cold targets, i.e. targets which are either above or below the background temperature. For this purpose, a common alternating voltage source 52 is employed to energize the chopper 24 and the phase detector 50. A signal voltage greater than the reference voltage corresponds to a hot target and the signal voltage from the chopper will be of one phase sense; a signal voltage less than the reference voltage corresponds to a cold target and the signal voltage from the chopper will be of the opposite phase sense. Accordingly, the phase detector 50 will develop an output control voltage corresponding in phase sense and amplitude to the direction and extent of temperature difference between the existing target and the background area. A map of the targets within the selected area is constructed by a bipolar indicator 54 which responds to the control voltage from the phase detector 50. The bipolar indicator 54 suitably takes the form of a facsimile recorder such as that shown in FIGURE 6 for costructing a strip map. For this purpose, the system is mounted in a vehicle such as an aircraft and the antenna is suitably stabilized with its azimuth scan axis in the same vertical plane as the aircraft velocity vector relative to the ground. The antenna is caused to scan the selected area by the antenna drive mechanism 56. The recorder comprises a rotatable drum 58 having a scanning recording element or electrode 60 on its surface which is of helical configuration. A fixed recording element or electrode 62 is disposed in spaced relation to the rotatable drum and a record medium or paper 64 is disposed therebetween. The paper is sensitive to an electric field between the electrodes and changes its record intensity or color shading in accordance with the intensity of the field. The paper is advanced past the recording elements by a drive mechanism 66 at a rate proportional to vehicle speed and the drum is rotated synchronously with the scanning motion of the antenna by a suitable connection with the antenna drive mechanism 56. Since the field intensity between the electrodes varies with the instantaneous value of the change in received thermal power, a thermal map of the targets within the selected background area is produced upon the record medium.

Before discussing the performance of a typical system, it will be helpful to consider briefly the effects of atmospheric attenuation and radiation as well as the relation between actual and effective temperatures. The thermal energy radiated by a body must pass through the atmosphere to reach the receiving antenna and is subject to absorption by the atmosphere which results in an apparent reduction of the radiated energy. The amount of absorption is dependent upon the distance travelled, the condition of the atmosphere and the frequency of the radiation. It can be shown that the attenuation as a function of range varies exponentially in the following manner:

$$P = P_R(1-X) \tag{20}$$

where
$P$ = the power received.
$P_R$ = the total radiated power.
$(1-X) = (1-X')^r$ = the total attenuation factor.
$(1-X')$ = the fractional transmission coefiicient of the atmosphere.
$r$ = distance through the atmosphere.
$X$ = absorption efficiency of the atmosphere.

It can be shown that, for a vertical path, the attenuation per unit distance varies with altitude and the majority of attenuation occurs at the lower altitudes. The attenuation approaches a maximum value as altitude increases. For an oblique path relative to the vertical, the distance through the atmosphere varies as the secant of the angle and the attenuation varies exponentially as the secant of the angle. However, the atmosphere itself may be considered a radiating body with a radiation efficiency equal to its absorption efficiency. Therefore, the power radiated by the atmosphere is $$P_a = XT_a k B_R \tag{21}$$

where
$T_a$ is the absolute temperature of the atmosphere at the earth's surface.

This radiated power from the atmosphere must be added to the attenuated radiated power from the background area intercepted by the antenna to obtain the total received power. The total received power is obtained by combining Equations 20 and 21 as follows:

$$P = P_R(1-X) + P_a \qquad (22)$$

To determine the total received power from the earth in the absence of targets within the intercepted background area, it may be considered that the temperature of the earth is approximately equal to the temperature of the atmosphere. Thus, the power radiated from the atmosphere may be expressed as $$P_a = XkT_E B_R = XP_E \qquad (23)$$

and the total received power from the earth in the absence of a target may be expressed by substituting Equation 23 into Equation 22 to obtain $$P_E = P_E(1-X) + XP_E \qquad (24)$$

When a target is present in the background area, the radiated power is the sum of that due to the earth plus the change in power due to the target or $$P_R = P_E + \Delta P \qquad (25)$$

and substituting Equations 25 and 23 into Equation 22 yields the expression for the received power as follows:

$$P = (P_E + \Delta P)(1-X) + XP_E \qquad (26)$$

This may be expressed in terms of temperatures and including the effect of an oblique path by the following $$T = T_E + \frac{\Omega_T}{\Omega_A} T(1-X)^{\sec \theta} \qquad (27)$$

The effective temperature of a body depends not only upon its absolute temperature but also upon its coefficient of reflection and the radiation incident upon the body from the atmosphere. A body having a reflection coefficient $p$ will have an absorption coefficient $(1-p)$ since the energy which is not reflected must be absorbed. Since the body absorbs energy with an efficiency of $(1-p)$, it will also radiate energy with the same efficiency. The energy radiated by the body itself is the amount of energy radiated by a black body at the same temperature multiplied by the radiation efficiency.

Thus the total energy radiating from the body is the sum of the reflected energy plus the energy directly radiated. This expressed as follows:

$$P_{T'} = (1-p)P_T + pP_a \qquad (28)$$

where
$P_{T'}$ = the total radiation from the body.

This equation may be rewritten in terms of temperature as follows:

$$kT_{T'}B_R = (1-p)kT_T B_R + pXkT_a B_R \qquad (29)$$

which reduces to $$T_{T'} = (1-p)T_T + pXT_A \qquad (30)$$

where
$T_{T'}$ = the effective temperature of the target.

Thus, the effective temperature of a body is determined not only by its actual temperature but also by the temperature of any other bodies which might be reflected by the radiating body.

The difference in effective temperatures of the earth and targets are of prime interest and the effective temperature of the earth can be computed from Equation 30. Taking a reflection coefficient of 0.05, equal temperatures of the earth and atmosphere at 300° K., and an absorption efficiency of 0.03 for the atmosphere, the effective temperature of the earth is about 285° K. The same computation for the effective temperature of a metal surface which has a reflection coefficient of unity at microwave frequencies yields an effective temperature of 9° K. The effective temperature of a body of water which is partially reflecting and having a coefficient of reflection 0.65, the effective temperature is $T_{T'} = 111°$ K. These computations permit the effective temperature difference to be determined between the background earth and the selected targets and from Equation 27, the change of background power due to the target can be determined.

In the typical system shown in FIGURE 4, the operating frequency is X-band and the antenna is a 30 inch parabola with a bandwidth of 1,000 megacycles. The travelling wave tube 38 has a noise figure of 15 db and bandwidth of 4,000 megacycles and the travelling wave tube 40 has a noise figure of 30 db with a bandwidth of 4,000 megacycles. The overall gain of the travelling wave tubes is approximately 55 db and the RF filter 42 has a bandpass of 1,000 megacycles to restrict the bandpass of the amplifier. The detector is a crystal-video type diode and operates as a square law detector. The antenna scan rate is 100° per second and the antenna beam width is 3°. For these parameters the bandpass of the filter 32 is 23 cycles per second. Operating such a system at an altitude of 50,000 feet and under conditions of moderately heavy precipitation, the signal-to-noise ratio for a land-water boundary is of the order of 35 db and for a medium-sized metal roof building, the signal-to-noise ratio is 1.3 db.

Although the description of this invention has been given with respect to a particular embodiment, it is not to be construed in a limiting sense. Numerous variations and modifications within the spirit and scope of the invention will now become apparent to those skilled in the art. For a definition of the invention, reference is made to the appended claims.

I claim:

1. A radiometer for detecting targets within a background area and including a receiving antenna, an amplifier coupled with the antenna for developing a voltage corresponding to the radiated power incident upon the antenna, a detector connected with the amplifier for developing a direct signal voltage corresponding in amplitude to the power applied by the amplifier to the detector, a reference voltage generator having an input connected with the output of the amplifier for developing a reference voltage corresponding to the power radiated from the background area in the absence of a target, a modulator having one input connected with the output of the detector and having another input connected with the output of the reference voltage generator and combining the voltages therefrom differentially for developing a signal voltage corresponding to the magnitude and sense of change in received power due to the presence of a target within the background area, and utilization means connected with said modulator.

2. A radiometer for detecting targets within a background area and including a receiving antenna, an amplifier coupled with the antenna for developing a voltage corresponding to the radiated power incident upon the antenna, a detector having its input connected with the output of the amplifier for developing a direct signal voltage corresponding in amplitude to the power applied by the amplifier to the detector, a reference voltage generator having its input connected with the output of the detector for developing a reference voltage corresponding to the power radiated from the background area in the absence of a target, a modulator having one input connected with the output of the detector and having another input connected with the output of the reference voltage generator and combining the voltages therefrom differentially for developing a signal voltage corresponding to the magnitude and sense of change in received power due to the presence of a target within the background area, and utilization means connected with said modulator.

3. A radiometer for detecting targets within a background area and including a receiving antenna, an amplifier coupled with the antenna for developing a voltage corresponding to the radiated power incident upon the antenna, a detector having its input connected with the output of the amplifier for developing a direct signal voltage corresponding in amplitude to the power applied by the amplifier to the detector, a reference voltage generator having its input connected with the output of the detector for developing a direct reference voltage corresponding to the power radiated from the background area in the absence of a target, a modulator having one input connected with the output of the detector and having another input connected with the output of the reference voltage generator and combining the voltages therefrom differentially for developing a signal voltage corresponding to the magnitude and sense of change in received power due to the presence of a target within the background area, a bandpass filter connected with the output of said modulator and having its maximum response at a frequency corresponding to the frequency of said modulator, and utilization means connected with said filter.

4. A radiometer for detecting targets within a background area and including a receiving antenna, an amplifier having an input terminal coupled with the antenna for developing a voltage on its output terminal corresponding to the radiated power incident upon the antenna, a detector for developing a direct signal voltage on its output terminal corresponding in amplitude to the power applied to its input terminals, a reference voltage generator including a source of voltage and a manually adjustable attenuator for developing a reference voltage on its output terminal corresponding to the sum of the power radiated from the background area in the absence of a target and the noise power of the amplifier, a modulator having one input terminal connected with the output terminals of the reference voltage generator and another input terminal connected with one of the remaining output terminals and combining the voltages therefrom differentially for developing a signal voltage corresponding to the magnitude and sense of change in received power due to the presence of a target within the background area, and utilization means connected with the other remaining output terminal.

5. A radiometer for detecting targets within a background area and including a receiving antenna, an amplifier coupled with the antenna for developing a voltage corresponding to the radiated power incident upon the antenna, a detector having an input connected with the output of the amplifier for developing a direct signal voltage corresponding in amplitude to the power applied by the amplifier to the detector, a reference voltage generator including a low pass filter having an input connected with the detector and having a cut-off frequency corresponding to the frequency of occurrence of targets within the background area to develop a reference voltage corresponding to the power radiated from the background area in the absence of a target, a modulator having one input connected with the output of the detector and having another input connected with the output of said reference voltage generator and combining the voltages therefrom differentially for developing a signal voltage corresponding to the magnitude and sense of change in received power due to the presence of a target within the background area, and utilization means connected with the output of said modulator.

6. A radiometer for detecting targets within a background area and including a receiving antenna, an amplifier coupled with the antenna for developing a voltage corresponding to the radiated power incident upon the antenna, a detector having an input connected with the output of the amplifier for developing a direct signal voltage corresponding in amplitude to the power applied by the amplifier to the detector, a reference voltage generator including a low pass filter having an input connected with the output of the detector and having a cut-off frequency corresponding to the frequency of occurrence of targets within the background area to develop a reference voltage corresponding to the power radiated from the background area in the absence of a target, a modulator having one input connected with the output of the detector and having another input connected with the output of said reference voltage generator and combining the voltages therefrom differentially for developing a signal voltage corresponding to the magnitude and sense of change in received power due to the presence of a target within the background area, a bandpass filter having its input connected with the output of the modulator and having its maximum response at the frequency of said modulator and a bandwidth directly proportional to the rate of target occurrence within the beam pattern of said antenna and inversely proportional to the beam width of said antenna whereby the bandpass filter provides maximum signal-to-noise ratio without loss of information in said signal, and utilization means connected with the output of said bandpass filter.

7. A radiometer for detecting targets within a background area and including a receiving antenna, an amplifier coupled with the antenna for developing a voltage corresponding to the radiated power incident upon the antenna, a detector having an input connected with the output of the amplifier for developing a direct signal voltage corresponding in amplitude to the power applied by the amplifier to the detector, a reference voltage generator including a low pass filter having an input connected with the output of the detector and having a cut-off frequency corresponding to the frequency of occurrence of targets within the background area to develop a reference voltage corresponding to the power radiated from the background area in the absence of a target, a chopper having one input connected with the output of the detector and having another input connected with the output of said reference voltage generator and combining the voltages therefrom differentially for developing a signal voltage corresponding to the magnitude and sense of change in received power due to the presence of a target within the background area, a phase detector having an input connected with the output of the chopper, means for energizing said chopper and said phase detector in synchronism, and a bipolar indicator having an input connected with the output of said phase detector.

8. A radiometer for detecting targets within a background area and including a receiving antenna, an amplifier coupled with the antenna for developing a voltage corresponding to the radiated power incident upon the antenna, a detector having an input connected with the output of the amplifier for developing a direct signal voltage corresponding in amplitude to the power applied by the amplifier to the detector, a reference voltage generator including a low pass filter having an input connected with the output of the detector and having a cut-off frequency corresponding to the frequency occurrence of targets within the background area to develop a reference voltage corresponding to the power radiated from the background area in the absence of a target, a chopper having one input connected with the output of the detector and having another input connected with the output of said reference voltage generator and combining the voltages therefrom differentially for developing a signal voltage corresponding to the magnitude and sense of change in received power due to the presence of a target within the background area, a bandpass filter connected with the output terminals of the chopper and having its maximum response at the frequency of said chopper and a bandwidth of about 70 percent of the ratio of the rate of target occurrence within the beam pattern of the antenna to the beamwidth of the antenna, a phase detector having its input connected with the output of said chopper, means for energizing said chopper and said phase detector in synchronism, and a bipolar indicator having its input connected with the output of said phase detector.

9. A system for producing a thermal map of targets within a background area and adapted to be carried on a vehicle comprising a radiometer including a receiving antenna, amplifying means coupled with the antenna for developing a voltage corresponding to the radiated power incident upon the antenna, a reference voltage generator for developing a reference voltage corresponding to the power radiated from the background area in the absence of a target, a modulator having one input connected with the output of the amplifying means and having another input connected with the output of the reference voltage generator and combining the voltages therefrom differentially for developing a signal voltage corresponding to the magnitude and sense of change in received power due to the presence of a target within the background area, a drive mechanism connected with the antenna to impart motion thereto for scanning a selected background area at a predetermined scan rate, a bandpass filter having its input connected with the output of the modulator and having its maximum response at the frequency of said modulator and a bandwidth directly proportional to said scan rate and inversely proportional to the beam width of said antenna, and utilization means connected with the output of the bandpass filter.

10. A system for producing a thermal map of targets within a background area and adapted to be carried on a vehicle comprising a radiometer including a receiving antenna, an amplifier coupled with the antenna for developing a voltage corresponding to the radiated power incident upon the antenna, a detector having input connected with the output of the amplifier for developing a direct signal voltage corresponding in amplitude to the power applied by the amplifier to the detector, a reference voltage generator including a low pass filter having an input connected with the output of the detector and having a cut-off frequency corresponding to the frequency occurrence of targets within the background area to develop a reference voltage corresponding to the power radiated from the background area in the absence of a target and the amplifier noise power, a modulator having one input connected with the output of the detector and having another input connected with the output of said reference voltage generator and combining the voltages therefrom differentially for developing a signal voltage corresponding to the magnitude and sense of change in received power due to the presence of a target within the background area, a bandpass filter connected with the output of the modulator and having its maximum response at the frequency of the modulator and having a bandwidth corresponding to the ratio of the rate of target occurrence within the beam pattern of the antenna to the beam width of the antenna, a phase detector having an input connected with the output of the modulator, means for energizing the modulator and phase detector in synchronism, a drive mechanism connected with the antenna to impart motion thereto for scanning a selected background area, a facsimile recorder including a recording medium and recording element, means for advancing the recording medium at a rate proportional to vehicle velocity, means connecting the recording element with said drive mechanism for displacement thereof in synchronism with said antenna motion, and energizing means for the recording element connected between the phase detector and the recording element and responsive to the signal voltage for varying the record intensity in accordance with the magnitude and sense of the change in received power.

11. A radiometer for detecting targets within a background area and including a receiving antenna, an amplifier coupled with the antenna developing a voltage corresponding to the power incident upon the antenna radiated from the background area and targets present within the area, a detector connected with the amplifier for developing a direct signal voltage corresponding in amplitude to the radiated power and the noise power of the amplifier, a voltage comparison means adapted to develop an output voltage corresponding to the difference of two input voltages and having one input connected with the output of the detector, and an integrator having a sufficiently long time constant to remove variations in the detector output voltage due to the presence of a target and being connected between the output of the detector and another input of said comparison means whereby the detector develops a signal voltage corresponding to the magnitude and sense of change in radiated power due to the presence of a target within the background area.

12. A radiometer for detecting targets within a background area and including a receiving antenna, an amplifier coupled with the antenna developing a voltage corresponding to the power incident upon the antenna radiated from the background area and targets present within the area, a detector connected with the amplifier developing an output voltage having a direct component corresponding to the radiated power and the noise power of the amplifier and an alternating component representing detector noise voltage, a voltage comparison circuit adapted to develop an output voltage corresponding to the difference of two input voltages and having one input connected with the output of the detector, a low pass amplifier connected with the output of the comparison circuit and having a sufficiently long time constant to remove the alternating component of the detector output voltage, and an integrator having a sufficiently long time constant to remove variations in the low pass amplifier output voltage due to the presence of a target and being connected between the output of the low pass amplifier and the other input of said comparison circuit whereby the low pass amplifier develops a signal voltage corresponding to the magnitude and sense of change in radiated power due to the presence of a target within the background area.

13. A system for detecting targets within a background area and comprising a radiometer including a receiving antenna, amplifying means coupled with the antenna for developing a voltage corresponding to the radiated power incident upon the antenna, a detector connected with the amplifier for developing a direct signal voltage corresponding in amplitude to the power applied by the amplifier to the detector, a direct current comparison circuit having a first input terminal connected to the output terminal of said detector, a low pass amplifier connected with said comparison circuit for removing alternating components from the output voltage of said detector, reference voltage developing circuit connected between the output of the low pass amplifier and another input terminal of the comparison circuit for removing changes in signal voltage corresponding to the occurrence of targets within the background area, the reference voltage and the signal voltage applied to the comparison circuit being equal in amplitude and opposite in polarity in the absence of a target in the background area whereby the voltage components corresponding to background radiated power and the noise power developed by the first mentioned amplifier are removed from the output voltage of said low pass amplifier and said output voltage thereby corresponds to the magnitude and sense of change in received power due to the presence of the target within the background area, and utilization means connected with the output terminal of the low pass amplifier.

14. A radiometer for detecting targets within a background area and including a receiving antenna and amplifying means coupled therewith for developing a voltage corresponding to the power incident upon the antenna radiated from the background area within the radiation responsive pattern of the antenna and targets included therein, means for displacing said antenna to scan the background area at a known rate whereby the power incident upon the antenna varies with the occurrence of different targets, a reference voltage means having an input connected with the output of the amplifying means for developing a reference voltage corresponding to the power radiated from the background area with target induced variations eliminated, combining means having one input connected with the output of the amplifying means and another input connected with the output of the reference voltage means and combining the voltages therefrom differentially for developing a signal voltage corresponding to the magnitude and sense of change in the received power due to the presence of a target within the background area, and utilization means connected with the combining means.

References Cited in the file of this patent

UNITED STATES PATENTS

| | | |
|---|---|---|
| 2,392,873 | Zahl | Jan. 15, 1946 |
| 2,403,562 | Smith | July 9, 1946 |
| 2,410,424 | Brown | Nov. 5, 1946 |
| 2,466,959 | Moore | Apr. 12, 1949 |
| 2,561,345 | Deloraine | July 24, 1951 |
| 2,698,433 | Ringoen | Dec. 28, 1954 |
| 2,958,080 | Aiken | Oct. 25, 1960 |

OTHER REFERENCES

Dicke: The Measurement of Thermal Radiation at Microwave Frequencies, The Review of Scientific Instruments, vol. 17, No. 7, July 1946, pp. 268–275.

Klass: Passive Radar Gives Infrared Technique, Missile Engineering, October 1957, pp. 32–35, IR Digest.

UNITED STATES PATENT OFFICE
CERTIFICATE OF CORRECTION

Patent No. 3,129,330

April 14, 1964

Theodore V. Seling

It is hereby certified that error appears in the above numbered patent requiring correction and that the said Letters Patent should read as corrected below.

Column 1, line 45, for "micro-wave" read -- micro-micro --; column 5, line 46, for "same" read -- sum --; column 8, line 17, for "costructing" read -- constructing --; column 10, line 6, for "boly" read -- body --.

Signed and sealed this 27th day of October 1964.

(SEAL)
Attest:

ERNEST W. SWIDER
Attesting Officer

EDWARD J. BRENNER
Commissioner of Patents